US011012503B2

(12) United States Patent
Jung et al.

(10) Patent No.: US 11,012,503 B2
(45) Date of Patent: *May 18, 2021

(54) APPLICATION DEPLOYMENT ENGINE

(71) Applicant: AT&T Intellectual Property I, L.P., Atlanta, GA (US)

(72) Inventors: Gueyoung Jung, Belle Mead, NJ (US); Kaustubh Joshi, Scotch Plains, NJ (US); Matti A. Hiltunen, Morristown, NJ (US); Richard D. Schlichting, New Providence, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/790,848

(22) Filed: Feb. 14, 2020

(65) Prior Publication Data
US 2020/0186593 A1 Jun. 11, 2020

Related U.S. Application Data

(63) Continuation of application No. 16/153,908, filed on Oct. 8, 2018, now Pat. No. 10,567,487, which is a (Continued)

(51) Int. Cl.
*H04L 29/08* (2006.01)
*H04L 12/24* (2006.01)
*G06F 8/60* (2018.01)

(52) U.S. Cl.
CPC .............. *H04L 67/10* (2013.01); *G06F 8/60* (2013.01); *H04L 29/08135* (2013.01);
(Continued)

(58) Field of Classification Search
CPC ......... H04L 29/08135; H04L 29/08171; H04L 29/08261; H04L 41/08–0806;
(Continued)

(56) References Cited

U.S. PATENT DOCUMENTS 8,775,590 B2   7/2014   Devarakonda et al.
8,832,234 B1   9/2014   Brooker et al.
(Continued)

OTHER PUBLICATIONS

Jung et al., "Ostro: Scalable Placement Optimization of Complex Application Topologies in Large-Scale Data Centers," The 35th IEEE International Conference on Distributed Computing Systems, Jun. 29-Jul. 2, 2015.
(Continued)

*Primary Examiner* — Brendan Y Higa
(74) *Attorney, Agent, or Firm* — Hartman & Citrin LLC

(57) ABSTRACT

Concepts and technologies are disclosed herein for an application deployment engine. A processor that executes an application deployment engine can receive an application request. The processor can obtain network topology data that indicates availability of resources of a data center, an application template associated with the application, and a running time during which an application placement plan is to be identified out of a large number of placement scenarios within the running time. The application template can describe an application flow path associated with the application. The processor can identify the application placement plan, where the application placement plan can include an optimal placement of the application at the data center, before a given running time expires by pruning the large search space. The processor can generate a command to effect deployment of the application in accordance with the application placement plan.

20 Claims, 5 Drawing Sheets

Related U.S. Application Data continuation of application No. 14/851,205, filed on Sep. 11, 2015, now Pat. No. 10,097,621.

(52) U.S. Cl.
CPC ...... *H04L 41/5051* (2013.01); *H04L 41/5054* (2013.01); *H04L 67/34* (2013.01); *H04L 69/329* (2013.01); *H04L 41/12* (2013.01)

(58) Field of Classification Search
CPC ... H04L 41/0823–0836; H04L 41/0893; H04L 41/12–16; H04L 41/5041–5054; H04L 41/5096; H04L 67/10; H04L 67/1002; H04L 67/1008; H04L 67/1025; H04L 67/1029; H04L 67/1036; H04L 41/5003–5016

See application file for complete search history.

(56) References Cited

U.S. PATENT DOCUMENTS

| | | | |
|---|---|---|---|
| 8,909,769 B2 | 12/2014 | Radhakrishnan | |
| 8,918,392 B1 | 12/2014 | Brooker et al. | |
| 8,930,364 B1 | 1/2015 | Brooker et al. | |
| 8,935,203 B1 | 1/2015 | Brooker et al. | |
| 8,959,523 B2 | 2/2015 | Patil et al. | |
| 8,972,956 B2* | 3/2015 | Brownlow | G06F 11/3616 717/131 |
| 9,813,318 B2* | 11/2017 | Iyoob | H04L 41/5054 |
| 2003/0120780 A1* | 6/2003 | Zhu | H04L 67/101 709/226 |
| 2011/0320606 A1* | 12/2011 | Madduri | G06F 9/5005 709/226 |
| 2012/0303740 A1 | 11/2012 | Ferris | |
| 2013/0030859 A1* | 1/2013 | Jung | G06Q 10/06 705/7.26 |
| 2013/0111033 A1 | 5/2013 | Mao | |
| 2013/0111034 A1* | 5/2013 | Upadhya | H04L 67/1097 709/226 |
| 2014/0095694 A1* | 4/2014 | Kimmet | G06F 11/3003 709/224 |
| 2014/0278326 A1 | 9/2014 | Sharma et al. | |
| 2014/0317166 A1* | 10/2014 | Iyoob | G06Q 40/00 709/201 |
| 2015/0074278 A1* | 3/2015 | Maes | H04L 67/10 709/226 |
| 2015/0213106 A1 | 7/2015 | Kunde | |
| 2016/0036725 A1* | 2/2016 | Syed | H04L 67/10 709/226 |
| 2016/0105489 A1 | 4/2016 | Llorca | |
| 2016/0164723 A1* | 6/2016 | Cimprich | H04L 47/27 709/221 |
| 2016/0259795 A1 | 9/2016 | Brandys | |
| 2018/0101415 A1* | 4/2018 | Mahindru | G06F 11/3062 |

OTHER PUBLICATIONS

Qui et al., "On the Placement of Web Server Replicas," in Proceedings of the IEEE INFOCOM, Apr. 2001, pp. 1587-1596.
U.S. Office Action dated Oct. 2, 2017 in U.S. Appl. No. 14/851,205.
U.S. Office Action dated Feb. 14, 2018 in U.S. Appl. No. 14/851,205.
U.S. Notice of Allowance dated May 23, 2018 in U.S. Appl. No. 14/851,205.
U.S. Notice of Allowance dated Sep. 12, 2019 in U.S. Appl. No. 16/153,908.

* cited by examiner

APPLICATION DEPLOYMENT ENGINE

CROSS-REFERENCE TO RELATED APPLICATIONS

This application is a continuation of and claims priority to U.S. patent application Ser. No. 16/153,908, entitled "Application Deployment Engine," filed Oct. 8, 2018, now U.S. Pat. No. 10,567,487, which is incorporated herein by reference in its entirety; and which is a continuation of and claims priority to U.S. patent application Ser. No. 14/851,205, entitled "Application Deployment Engine," filed Sep. 11, 2015, now U.S. Pat. No. 10,097,621, which is incorporated herein by reference in its entirety.

BACKGROUND

A recent move in networking has been to cloud technologies that can allow some network functionality to be virtualized. Thus, some applications, services, networking functions, and the like can be virtualized as software appliances that can supplement and/or replace traditional hardware devices that may be tightly coupled to the software and/or functionality hosted by those devices. In some cases, large data centers can provide the hardware resources to host virtual machines that can execute software to provide functionality associated with certain applications or services, thereby obviating the traditional hardware/software coupling that has been relied upon for generations.

One advantage of cloud technologies over traditional networking technologies is the ability to deploy applications to resources without necessarily having to add and/or support new hardware infrastructure. On the other hand, identifying what resources of a large data center to deploy services to may be difficult as thousands or even several hundreds of thousands of deployment scenarios may be available to support a particular complex application that can consist of several hundreds of components. Thus, some cloud technologies may not deploy applications in an ideal manner.

SUMMARY

The present disclosure is directed to an application deployment engine. An application deployment engine can be executed by a server computer. The application deployment engine can receive or otherwise obtain an application request that requests deployment of an application. The application deployment engine can obtain network topology data that can be analyzed by the application deployment engine to determine a current availability of the resources of the data center. The current availability can include an availability of computing resources, storage resources, and/or transport resources. According to various embodiments of the concepts and technologies described herein, the server computer can analyze the application template and the network topology data to identify possible application placement plan candidates. The application deployment engine can analyze the application placement plan candidates to determine an application placement plan for the application that is determined to be optimal resource utilization.

The application deployment engine can obtain the network topology data, a running time for an analysis and decision making process to determine the optimal application placement plan out of several hundreds of thousands of placement scenarios within the running time, and an application template. The application template can specify resource requirements of the application that is being requested and application flows associated with the application components. The application deployment engine can determine possible placement plan candidates for the application and possible flow paths associated with the application components. The application deployment engine can select a path (of the possible flow paths on resources) that has an optimal resource utilization for further analysis. Specifically, the application deployment engine can determine a resource utilization associated with the flow path chosen for analysis and determine if the utilization exceeds a limit. If the utilization exceeds a limit, the application deployment engine can remove this candidate from consideration (e.g., no more path exploration of this candidate). If the utilization does not exceed a limit, the application deployment engine can add the candidate to a set of possible candidates for further path exploration and analysis at other times. The application deployment engine can determine if the path of application flow in the current chosen candidate is to be explored, and if so, a next exploration of the path of the candidate can be analyzed. These operations can be repeated until the path of a chosen candidate reaches the end of the path or until the given running time is expired.

The application deployment engine can, for each candidate in the set of candidates, apply a pruning function and a greedy algorithm to reduce the large search space (e.g., pruning out possibly non-optimal candidates) to finish identifying the optimal placement plan within the given running time. In some embodiments, the application deployment engine can adjust a pruning rate associated with the pruning function based upon a remaining running time. The application deployment engine can output the application placement plan determined before the given running time expires. In some embodiments, the application deployment engine can output the application placement plan to an orchestration service, and the orchestration service can generate one or more commands to deploy the application in accordance with the determined application placement plan. The orchestration service can be part of the application deployment engine or a separate entity.

According to one aspect of the concepts and technologies disclosed herein, a method is disclosed. The method can include receiving, at a processor that executes an application deployment engine, a request for an application. The processor can obtain network topology data that indicates availability of resources of a data center, an application template associated with the application, and a running time during which an application placement plan is to be identified out of a large number of placement scenarios. The application template can describe an application flow path associated with the application components. The processor can identify the application placement plan, where the application placement plan can include an optimal placement of the application at the data center. The processor can generate a command to effect deployment of the application in accordance with the application placement plan.

In some embodiments identifying the application placement plan can include determining if half of the running time has expired. If a determination is made that half of the running time has expired, the method can include applying a greedy algorithm to identify a base optimal placement plan for the application, determining a base utilization associated with the base optimal placement plan, and doubling a pruning rate associated with a pruning function. In some embodiments, the method also can include determining, from a pool of candidate placement plans, a candidate placement plan that has a best utilization value, and attempting placement of the application in accordance with the candidate placement plan.

In some embodiments, the method also can include in response to a determination that the candidate placement plan places all components of the application, outputting the candidate placement plan as the optimal placement. In some embodiments, the method also can include in response to a determination that the candidate placement plan does not place all components of the application, determining if the running time has expired, and in response to a determination that the running time has expired, outputting the base optimal placement plan as the optimal placement.

In some embodiments, the method also can include in response to a determination that the candidate placement plan does not place all components of the application, determining if the running time has expired. The method also can include in response to a determination that the running time has not expired, determining a set of candidate placement plans, determining a utilization value for each of the set of candidate placement plans, removing, from the set of candidate placement plans, candidate plans having associated utilization values that exceed a limit, removing, from the set of candidate placement plans, candidate plans having associated utilization values that exceed the base utilization, applying the pruning function to the set of candidate placement plans to remove a portion of the set of candidate placement plans in accordance with the pruning rate, and adding the set of candidate placement plans to the pool of candidate placement plans.

In some embodiments the application template can include an object formatted in javascript object notation format. In some embodiments the command can be distributed to the data center by an orchestration service. In some embodiments, outputting the optimal placement of the application can include outputting the optimal placement of the application to the orchestration service.

According to another aspect of the concepts and technologies disclosed herein, a system is disclosed. The system can include a processor and a memory. The memory can store computer-executable instructions that, when executed by the processor, cause the processor to perform operations. The operations can include receiving a request for an application, obtaining network topology data that indicates availability of a resource of a data center, obtaining an application template associated with the application, wherein the application template describes an application flow path associated with the application, obtaining a running time during which an application placement plan is to be identified out of a large number of placement scenarios, identifying the application placement plan, wherein the application placement plan includes an optimal placement of the application at the data center, and generating a command to effect deployment of the application in accordance with the application placement plan.

In some embodiments identifying the application placement plan can include determining if half of the running time has expired, and if a determination is made that half of the running time has expired, applying a greedy algorithm to identify a base optimal placement plan for the application, determining a base utilization associated with the base optimal placement plan, and doubling a pruning rate associated with a pruning function. In some embodiments identifying the application placement plan further can include determining, from a pool of candidate placement plans, a candidate placement plan that has a best utilization value, attempting placement of the application in accordance with the candidate placement plan, and in response to a determination that the candidate placement plan does not place all components of the application, determining if the running time has expired.

In some embodiments identifying the application placement plan further can include in response to a determination that the running time has not expired, determining a set of candidate placement plans, determining a utilization value for each of the set of candidate placement plans, removing, from the set of candidate placement plans, candidate plans having associated utilization values that exceed a limit, removing, from the set of candidate placement plans, candidate plans having associated utilization values that exceed the base utilization, applying the pruning function to the set of candidate placement plans to remove a portion of the set of candidate placement plans in accordance with the pruning rate, and adding the set of candidate placement plans to the pool of candidate placement plans. In some embodiments identifying the application placement plan further can include in response to a determination that the candidate placement plan places all components of the application, outputting the candidate placement plan as the optimal placement. In some embodiments the application template can include an object formatted in javascript object notation format.

According to yet another aspect of the concepts and technologies disclosed herein, a computer storage medium is disclosed. The computer storage medium can have computer-executable instructions stored thereon. When the computer-executable instructions are executed by a processor, the processor can perform operations. The operations can include receiving a request for an application, obtaining network topology data that indicates availability of a resource of a data center, obtaining an application template associated with the application, where the application template can describe an application flow path associated with the application, obtaining a running time during which an application placement plan is to be identified out of a large number of placement scenarios, identifying the application placement plan, wherein the application placement plan includes an optimal placement of the application at the data center, and generating a command to effect deployment of the application in accordance with the application placement plan.

In some embodiments identifying the application placement plan can include determining if half of the running time has expired, and if a determination is made that half of the running time has expired, applying a greedy algorithm to identify a base optimal placement plan for the application, determining a base utilization associated with the base optimal placement plan, and doubling a pruning rate associated with a pruning function. In some embodiments identifying the application placement plan further can include determining, from a pool of candidate placement plans, a candidate placement plan that has a best utilization value, attempting placement of the application in accordance with the candidate placement plan, and in response to a determination that the candidate placement plan does not place all components of the application, determining if the running time has expired.

In some embodiments identifying the application placement plan further can include in response to a determination that the running time has not expired, determining a set of candidate placement plans, determining a utilization value for each of the set of candidate placement plans, removing, from the set of candidate placement plans, candidate plans having associated utilization values that exceed a limit, removing, from the set of candidate placement plans, candidate plans having associated utilization values that exceed the base utilization, applying the pruning function to the set of candidate placement plans to remove a portion of the set of candidate placement plans in accordance with the pruning rate, and adding the set of candidate placement plans to the pool of candidate placement plans. In some embodiments the application template can include an object formatted in javascript object notation format.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1:
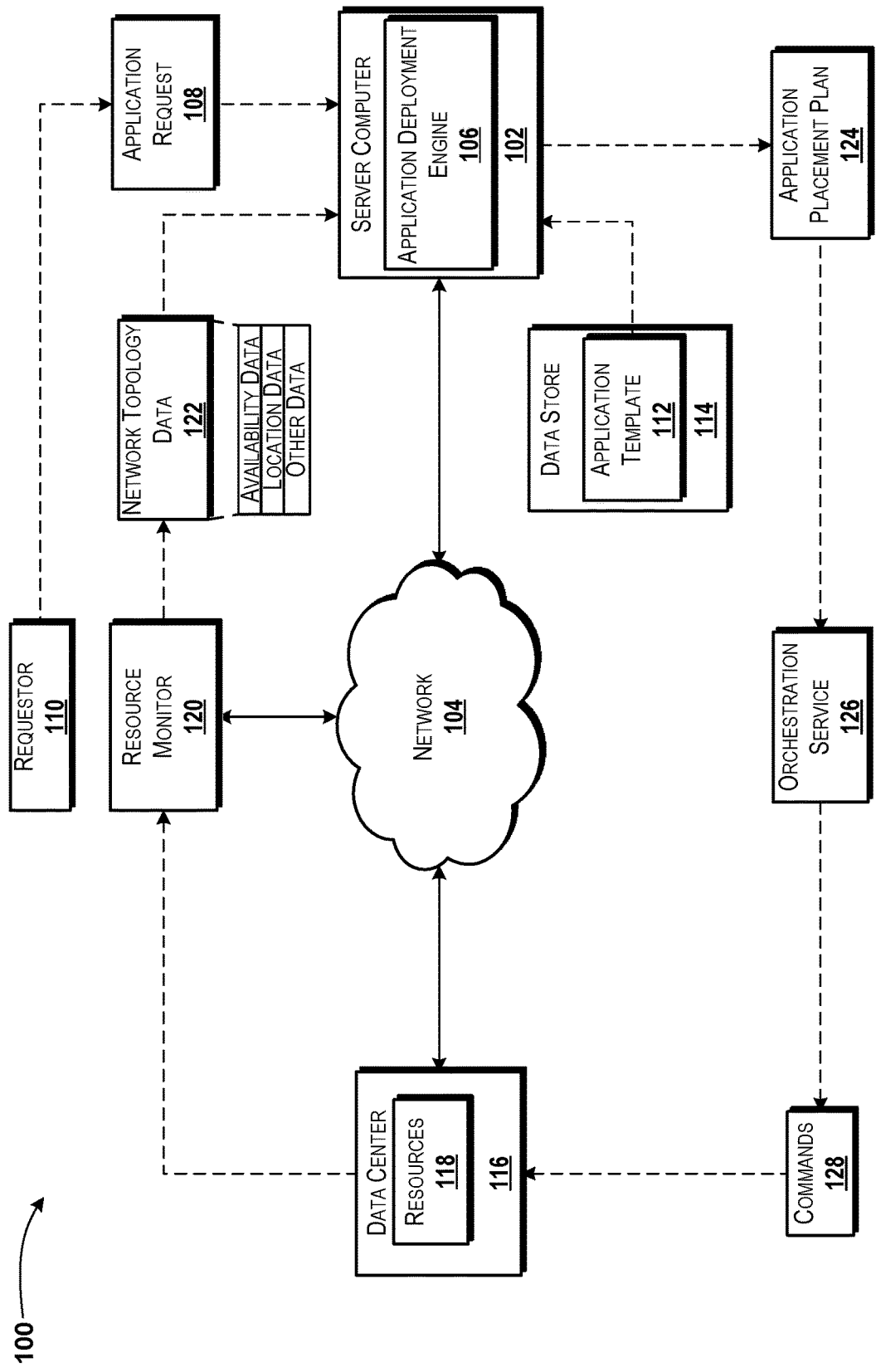
FIG. 1 is a system diagram illustrating an illustrative operating environment for various embodiments of the concepts and technologies described herein.

The following detailed description is directed to an application deployment engine. An application deployment engine can be executed by a server computer. The application deployment engine can receive or otherwise obtain an application request that requests deployment of an application. The application deployment engine can obtain network topology data that can be analyzed by the application deployment engine to determine a current availability of the resources of the data center. The current availability can include an availability of computing resources, storage resources, and/or transport resources. According to various embodiments of the concepts and technologies described herein, the server computer can analyze the application template and the network topology data to identify possible application placement plan candidates. The application deployment engine can analyze the application placement plan candidates to determine an application placement plan for the application that is determined to be optimal resource utilization.

The application deployment engine can obtain the network topology data, a running time for an analysis and decision making process to determine the application placement plan out of a large number of placement scenarios within the running time, and an application template. The application template can specify resource requirements of the application that is being requested and/or application flows associated with the application. The application deployment engine can determine possible placement plan candidates for the application and possible flow paths associated with the application. The application deployment engine can select a path (of the possible flow paths on resources) that has an optimal resource utilization for further analysis. Specifically, the application deployment engine can determine a utilization associated with the flow path chosen for analysis and determine if the utilization exceeds a limit. If the utilization exceeds a limit, the application deployment engine can remove this candidate from consideration (e.g., no more path exploration from this candidate). If the utilization does not exceed a limit, the application deployment engine can add the candidate to a set of possible candidates for further path exploration and analysis from this candidate at other times. The application deployment engine can determine if the path of the application in a chosen candidate is to be explored, and if so, a next exploration of the path of the candidate can be analyzed. These operations can be repeated until the path of the application in a chosen candidate reaches the end of the flow or until the given running time is expired.

The application deployment engine can, for each candidate in the set of candidates, apply a pruning function and a greedy algorithm to reduce the large search space. In some embodiments, the application deployment engine can adjust a pruning rate associated with the pruning function based upon a remaining running time. The application deployment engine can output the application placement plan determined. In some embodiments, the application deployment engine can output the application placement plan to an orchestration service, and the orchestration service can generate one or more commands to deploy the application in accordance with the determined application placement plan. The orchestration service can be part of the application deployment engine or a separate entity.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for providing and using an application deployment engine will be described, according to an illustrative embodiment. The operating environment 100 shown in FIG. 1 includes a server computer 102. According to various embodiments, the server computer 102 can operate in communication with and/or as part of a communications network ("network") 104, though this is not necessarily the case in all embodiments.

According to various embodiments, the functionality of the server computer 102 may be provided by one or more web servers, application servers, desktop computers, laptop computers, other computing systems, and the like. It should be understood that the functionality of the server computer 102 can be provided by a single device, by two similar devices, and/or by two or more dissimilar devices. For purposes of describing the concepts and technologies disclosed herein, the server computer 102 is described herein as a server computer that has a memory and a processor. It should be understood that this embodiment is illustrative, and should not be construed as being limiting in any way.

The server computer 102 can execute an operating system (not shown in FIG. 1) and one or more application programs such as, for example, an application deployment engine 106. The operating system can include a computer program that can control the operation of the server computer 102. The application deployment engine 106 can include an executable application configured to execute on top of the operating system to provide various functions illustrated and described herein for placing applications at data centers and/or resources based upon network topology and application requirements.

In particular, the application deployment engine 106 can be configured to receive or otherwise obtain an application request 108. In some embodiments, the application deployment engine 106 can receive the application request 108 from a requestor 110. The requestor 110 can include almost any entity. For example, according to various embodiments, the requestor 110 can correspond to a device associated with a network operator, an application, a service, a customer, a user, combinations thereof, or the like. For example, a network operator may generate a command or request to create and/or instantiate an application for a particular purpose or need. It should be understood that this example is illustrative and therefore should not be construed as being limiting in any way.

While the application request 108 is illustrated in FIG. 1 as being received by the server computer 102 from the requestor 110, it should be understood that this is not necessarily the case. In particular, according to various embodiments of the concepts and technologies described herein, the requestor 110 or other entity can interact with the server computer 102 to create the application request 108. In one contemplated example, the application deployment engine 106 can expose an application programming interface ("API") or other functionality (e.g., a web page, portal, or the like) via which users can create commands or requests to create or instantiate applications. As such, the application request 108 can be created at the server computer 102 instead of being "received" by the server computer 102. Thus, the illustrated embodiment should be understood as being illustrative of one contemplated embodiment and should not be construed as being limiting in any way.

The application deployment engine 106 can analyze the application request 108 and determine, based upon the application request 108, what application(s) or service(s) will be instantiated. As will be explained in more detail below, the application deployment engine 106 can determine needs of the application and various aspects of one or more hosts for the application to determine an optimized application deployment scheme. Based upon an identity of the application requested by way of the application request 108, the application deployment engine 106 can obtain an application template 112. According to various embodiments of the concepts and technologies described herein, one or more application templates 112 can be stored at a data storage device such as the data store 114.

The functionality of the data store 114 can be provided by one or more server computers, hard disk drives, disk arrays, desktop computers, memory devices, databases or other data structures, other computing systems, and the like. In the illustrated embodiments, the functionality of the data store 114 is provided by a server computer that hosts or stores one or more of the application templates 112. It should be understood that this example is illustrative and therefore should not be construed as being limiting in any way.

The application templates 112 can represent various aspects of applications including utilizations of processor resources, utilization of storage resources, utilization of bandwidth resources, and the like. In some embodiments, the application templates 112 can be formatted as objects. In some embodiments, one or more of the objects can be formatted in javascript object notation ("JSON") format. The JSON format may be used for one or more of the application templates 112 because in some embodiments, the JSON format may be easy for machines to parse and use, and because humans may easily write objects in the JSON format as well. Thus, one or more of the application templates 112 can be easily authored and easily used, in some embodiments. It should be understood that this example is illustrative and therefore should not be construed as being limiting in any way.

The application templates 112 can define requirements for an application. Thus, by determining the application requested by way of the application request 108 and obtaining and analyzing the application template 112 associated with that application, the application deployment engine 106 can determine what components (e.g., compute components, storage components, network communication components, bandwidth, etc.) the application (requested by way of the application request 108) will use and/or need to have available. The application deployment engine 106 therefore can determine, based upon the application request 108 and the application template 112, needs of the application being requested such as virtual machines and/or components thereof that will be used to support the application, bandwidth requirements between components of the application, processing capabilities needed for the application, memory capabilities needed for the application, redundancy requirements (if any) for the application, combinations thereof, or the like. These and other aspects of the application can be determined by the application deployment engine 106 based upon information included in the application request 108 and/or the application template 112, in some embodiments. Because additional and/or alternative needs of the application can be determined by the application deployment engine 106 in additional and/or alternative ways, it should be understood that these examples are illustrative and therefore should not be construed as being limiting in any way.

In some embodiments, the application template 112 can include a data structure. The data structure can include data points such as parameters, flags, fields, headers, or the like, that can specify almost any aspect of the application requested by way of the application request 108. In some embodiments, the application template 112 can include a graph. The graph can indicate virtual machines by way of nodes, and edges that connect the nodes can correspond to communication paths associated with the application. Thus, the application template 112 can define resources that will be involved in execution of the application, communications and/or flows of data between those elements, bandwidth and/or capacity requirements for the flows and/or elements involved in the application, combinations thereof, or the like.

Thus, the application template 112 can indicate a structure of the application requested by way of the application request 108 including, but not limited to, a number of virtual machines that will support the application, how the virtual machines communicate with one another, data flows associated with the application, combinations thereof, or the like. Because the application templates 112 can describe other aspects of the application, it should be understood that these examples are illustrative and therefore should not be construed as being limiting in any way. As will be explained in more detail below, the application requirements can be used to determine a placement plan.

The operating environment 100 also can include one or more data centers 116, though only one data center 116 is shown in FIG. 1 for ease of description. The data center 116 can include and/or host one or more resources 118 such as, for example, computing resources, storage resources, transport resources, and/or other resources such as orchestration resources, monitoring resources, reporting resources, control resources, combinations thereof, or the like. According to various embodiments, the resources 118 can include a number of server computers or other hosts, as generally is understood. It should be understood that this example is illustrative and therefore should not be construed as being limiting in any way.

The operating environment 100 also can include a resource monitor 120. Although illustrated as operating independently of the data center 116, it should be understood that in some embodiments the resource monitor 120 can be included in the data center 116. For purposes of illustration, FIG. 1 illustrates the resource monitor 120 operating outside of the data center 116. This example embodiment is illustrative and therefore should not be construed as being limiting in any way.

The resource monitor 120 can be configured to determine a network topology of the data center 116 at any time. In some embodiments, the resource monitor 120 can capture the network topology of the data center 116 at some time and thereafter update a representation of the network topology at various times. For example, the resource monitor 120 may create and/or update a representation of the network topology at regular time intervals, when trigger events such as network updates are detected, in response to other triggers, at other times, combinations thereof, or the like. Thus, the resource monitor 120 can maintain an up-to-date model or representation of a network topology of the data center 116.

According to various embodiments of the concepts and technologies described herein, the resource monitor 120 can generate network topology data 122. The network topology data 122 can describe the network topology and therefore can correspond to the representation of the network topology as described herein. In some embodiments, the data center 116 can be configured to generate the network topology data 122 and/or provide the network topology data 122 to various entities (e.g., the resource monitor 120 and/or the server computer 102) at various times. In yet other embodiments, the server computer 102 can be configured to monitor the data center 116 and/or generate the network topology data 122. Because the network topology data 122 can be generated by other entities and/or can be generated at other times, it should be understood that these examples are illustrative and therefore should not be construed as being limiting in any way.

According to various embodiments, the network topology data 122 can represent each element of the data center 116 (and/or resources 118 thereof), utilizations of the data center 116 and/or resources 118, capacities of the data center 116 and/or resources 118, links associated with the data center 116 and/or resources 118, other capabilities of the data center 116 and/or resources 118, capacities of the data center 116 and/or resources 118, utilizations of the data center 116 and/or resources 118, and/or loads associated with the data center 116 and/or resources 118. These and/or other data associated with the data center 116 and/or resources 118 can be determined and/or collected at various times as explained above (e.g., intervals, upon triggers, etc.). It should be understood that these examples are illustrative and therefore should not be construed as being limiting in any way.

According to various embodiments, as shown in FIG. 1, the network topology data 122 can include availability data, location data, and/or other data. These aspects of the network topology data 122 are explained in more detail below. As noted above, the network topology data 122 can be analyzed by the application deployment engine 106 to identify resources 118 of the data center 116 that can provide the functionality requested by way of the application request 108 and to craft an application placement plan based upon these and other data inputs.

The availability data can describe availability of the data center 116 and/or resources 118. According to various embodiments of the concepts and technologies described herein, the availability data can describe processor, memory, and bandwidth availability associated with the data center 116 and/or resources 118. Thus, the availability data can indicate a processor capacity and/or utilization associated with the data center 116 and/or resources 118, a storage capacity and/or utilization associated with the data center 116 and/or resources 118, a bandwidth capacity and/or utilization associated with the data center 116 and/or resources 118, and/or other aspects of capacities and/or utilizations associated with the data center 116 and/or resources 118. It should be understood that these examples are illustrative and therefore should not be construed as being limiting in any way.

The location data can describe geographic locations associated with one or more components of the data center 116 and/or resources 118. The location data can describe geographic locations at which various elements of the data center 116 and/or resources 118 are located and/or geographic locations through which communications associated with the data center 116 and/or resources 118 pass (and/or geographic locations of elements that provide links between the elements). Because the location data can describe locations of any components of the data center 116 and/or resources 118, it should be understood that these examples are illustrative and therefore should not be construed as being limiting in any way.

The other data can describe any other information associated with the resources 118 and/or the data center 116. The other data therefore can include any information that may affect the resources 118 and/or the data center 116 such as, for example, power information, equipment age, service life, equipment ownership, manufacturer information, chipset information, operating system information, processor speed and/or memory information, combinations thereof, or the like. Because the other data can include any other information as illustrated and described herein with respect to the network topology data 122, it should be understood that these examples are illustrative and therefore should not be construed as being limiting in any way.

Based on the network topology data 122, the application deployment engine 106 can determine the current availability of the resources 118 of the data center 116. The current availability can include an availability of computing resources, storage resources, and/or transport resources. According to various embodiments of the concepts and technologies described herein, the server computer 102 can analyze the application template 112 and the network topology data 122 to identify possible application placement plan candidates. As will be explained in more detail below, the application deployment engine 106 can analyze one or more of the application placement plan candidates to determine an application placement plan 124 for the application that is determined to be optimal. The application placement plan 124 can define how the application will be deployed to the resources 118 of the data center 116, as will be explained in more detail below.

Briefly, to determine the application placement plan 124, the application deployment engine 106 can obtain network topology data 122, a running time for an analysis and decision making to determine the application placement plan 124, and an application template 112. As noted above, the application template 112 can be identified by the application deployment engine 106 based upon an identity of the application requested by way of an application request 108, in some embodiments, though this is not necessarily the case.

The application deployment engine 106 can identify the application placement plan 124. In some embodiments, the application deployment engine 106 can determine possible placement plan candidates for the application. In some embodiments, the application deployment engine 106 can determine all possible flow paths associated with the application, though this is not necessarily the case. The application deployment engine 106 can select a path (of the possible flow paths on resources 118 of data center 116) that has an optimal resource utilization for analysis.

The application deployment engine 106 can determine a utilization associated with the flow path chosen for analysis and determine if the utilization exceeds a limit. If the utilization exceeds a limit, the application deployment engine 106 can remove this candidate from consideration (e.g., the application deployment engine 106 may determine that the no more path exploration will be performed for this candidate). If the utilization does not exceed a limit, the application deployment engine 106 can add the candidate to a set of possible candidates for further path exploration and analysis. The application deployment engine 106 can determine if the path of the application in a chosen candidate is to be explored, and if so, a next exploration of the candidate can be analyzed. These operations can be repeated until the path of the application in a chosen candidate reaches the end of the path or until the given running time is expired.

The application deployment engine 106 then can, for each candidate in the set of candidates, apply a pruning function and a greedy algorithm to reduce the large search space. In some embodiments, the application deployment engine 106 can determine, prior to applying the pruning function, if half of the remaining running time has been used (the remaining running time can be the original running time at a first analysis, or a remaining running time as determined a first time that half of the running time is determined to have been used). If half of the remaining running time is determined to have been used, the application deployment engine 106 can double the pruning rate of the pruning function and thereby remove possible non-optimal application placement plans from consideration at twice the rate of the original pruning rate. Thus, the concepts and technologies described herein can be used to identify an optimal candidate in a minimum amount of time. Additional details of determining an optimal candidate will be illustrated and described below, particularly with reference to FIGS. 2-3.

After determining the application placement plan 124 that is optimal, the application deployment engine 106 can output the application placement plan 124. In some embodiments, the application deployment engine 106 can output the application placement plan 124 to an orchestration service 126, and the orchestration service 126 can generate one or more commands 128 to deploy the application in accordance with the determined application placement plan 124. Although the orchestration service 126 is illustrated as existing separately from the application deployment engine 106, it should be understood that in various embodiments the orchestration service 126 can be hosted by the server computer 102 and as such, the functionality of the orchestration service 126 and the application deployment engine 106 can be provided by computer-executable instructions executed by a processor of the server computer 102. It should be understood that this example is illustrative and therefore should not be construed as being limiting in any way. These and other aspects of the concepts and technologies described herein will be illustrated and described below in more detail.

FIG. 1 illustrates one server computer 102, one network 104, one requestor 110, one data store 114, one data center 116, one set of resources 118, and one resource monitor 120. It should be understood, however, that various implementations of the operating environment 100 can include zero, one, or more than one server computer 102; zero, one, or more than one network 104; zero, one, or more than one requestor 110; zero, one, or more than one data store 114; zero, one, or more than one data center 116; zero, one, or more than one set of resources 118; and/or zero, one, or more than one resource monitor 120. As such, the illustrated embodiment should be understood as being illustrative, and should not be construed as being limiting in any way.

Figure 2:
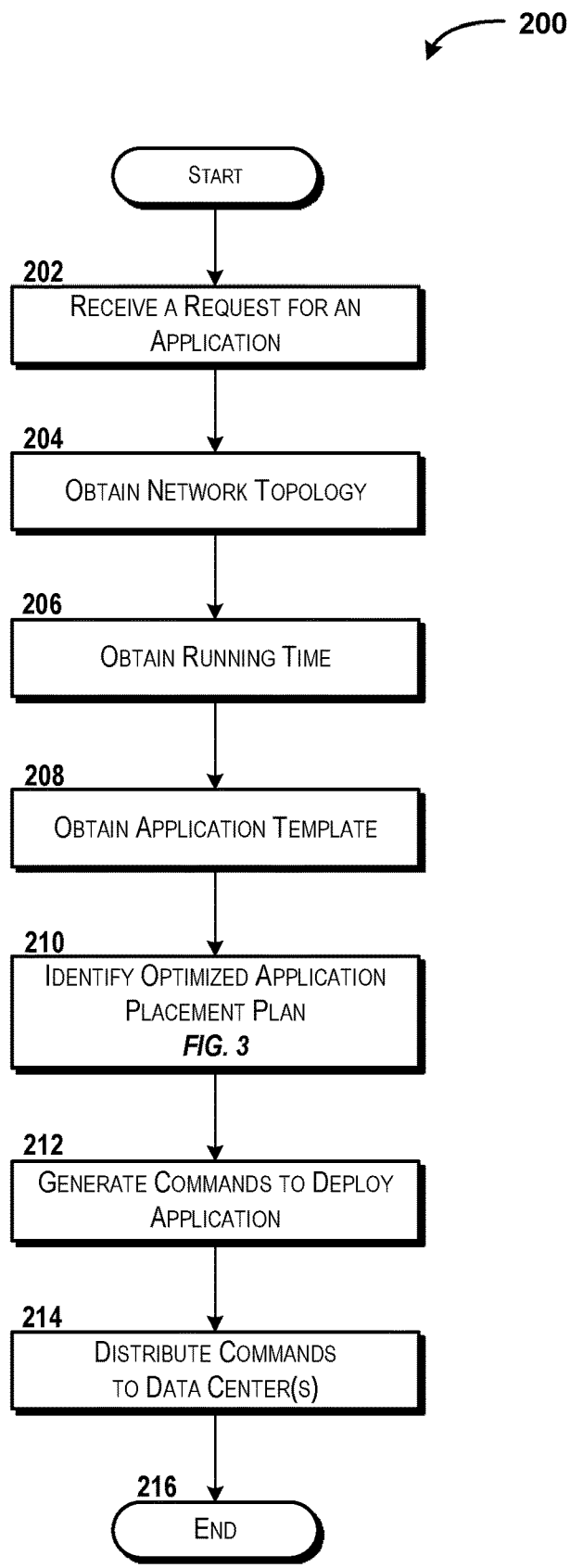
FIG. 2 is a flow diagram showing aspects of a method for deploying an application to one or more data centers using an application placement engine, according to an illustrative embodiment of the concepts and technologies described herein.

Turning now to FIG. 2, aspects of a method 200 for deploying an application to a data center 116 using an application deployment engine 106 will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the server computer 102, to perform one or more operations and/or causing the processor to direct other components of the computing system or device to perform one or more of the operations.

For purposes of illustrating and describing the concepts of the present disclosure, the methods disclosed herein are described as being performed by the server computer 102 via execution of one or more software modules such as, for example, the application deployment engine 106. It should be understood that additional and/or alternative devices and/or network nodes can provide the functionality described herein via execution of one or more modules, applications, and/or other software including, but not limited to, the application deployment engine 106. Thus, the illustrated embodiments are illustrative, and should not be viewed as being limiting in any way.

The method 200 can begin at operation 202. At operation 202, the server computer 102 can receive a request for an application. According to various embodiments of the concepts and technologies described herein, the request received in operation 202 can be similar to or even identical to the application request 108 illustrated and described above with reference to FIG. 1. As such, it can be appreciated that the request received in operation 202 can be generated by a requestor such as the requestor 110, though this is not necessarily the case.

The request received in operation 202 can correspond to a request to create or deploy an application to a data center 116. According to various embodiments of the concepts and technologies described herein, the request can correspond to a service call (e.g., the application deployment engine 106 can operate as a service that can be called or invoked by various users, applications, devices, or the like); an explicit request (e.g., a user, application, or other entity can request generation of the application placement plan 124); or other types of implicit and/or explicit requests. The server computer 102 can determine, in operation 202, that deployment of an application and/or determination of an application placement plan 124 is requested.

From operation 202, the method 200 can proceed to operation 204. At operation 204, the server computer 102 can obtain a network topology. As explained above with reference to FIG. 1, the network topology can describe or represent topology of the data center 116 and/or the resources 118 associated with the data center 116. According to various embodiments, the server computer 102 can obtain the network topology by way of receiving or otherwise obtaining network topology data 122 in operation 204. As illustrated and described in detail above, the network topology data 122 can describe availability of processor resources, storage resources, and/or bandwidth resources in the data center 116; location information; other information; combinations thereof; or the like.

The network topology data 122 therefore can represent availability and locations of components of the data center 116 and therefore can be used to determine resources 118 that can support the application. As explained above, the network topology data 122 also can indicate other information associated with the data center 116 such as, for example, geographical locations of the resources 118, ownership information for the resources 118, bandwidth capabilities of the resources 118, and/or other information. The information obtained in operation 204 can include, but is not necessarily limited to, the various types of information illustrated and described above with reference to the network topology data 122 in FIG. 1. These and other types of information can be used to determine what resources 118 can support the application and, as will be explained in more detail below, to identify an optimal placement of application components across the resources 118.

From operation 204, the method 200 can proceed to operation 206. At operation 206, the server computer 102 can obtain a running time. The running time can correspond to a time limit that is to be imposed on identifying an application placement plan 124 that is optimal (also referred to herein as an "optimal placement plan" or "optimal application placement plan"). According to various embodiments, the running time can be used to limit the analysis of the server computer 102 and also can be used to adjust a pruning rate associated with the pruning algorithm used by the server computer 102 (as will be explained in more detail below with reference to FIG. 3). Thus, the running time can not only limit a running time of the analysis, but also can be used to change a pruning rate of the pruning algorithm according to various embodiments. The running time can be defined in numbers of minutes (e.g., one minute, five minutes, thirty minutes, etc.), hours (e.g., one half an hour, one hour, five hours, ten hours, etc.), days (e.g., one day, etc.), or other time units. It should be understood that this example is illustrative and therefore should not be construed as being limiting in any way.

From operation 206, the method 200 can proceed to operation 208. At operation 208, the server computer 102 can obtain an application template 112. In particular, the server computer 102 can identify an application requested by way of the application request 108 received in operation 202 and identify an application template 112 associated with the application in operation 208. The application templates 112 can describe components of the data center 116 and/or resources 118 that will be used to support the application and/or application requirements associated with the application. The application template 112 also can describe data flows associated with the application. It should be understood that this example is illustrative and therefore should not be construed as being limiting in any way.

From operation 208, the method 200 proceeds to operation 210. At operation 210, the server computer 102 can identify an application placement plan 124 that is optimal for deploying the application. Additional details of identifying the application placement plan 124 will be illustrated and described in more detail below. Various aspects of identifying an optimal application placement plan will be illustrated and described in more detail below with reference to FIG. 3.

From operation 210, the method 200 can proceed to operation 212. At operation 212, the server computer 102 can generate one or more commands 128 to deploy the application in accordance with the placement plan determined in operation 210. Thus, the commands 128 generated in operation 212 can be generated to effect placement of the application as determined in the method 300 illustrated and described below. The commands 128 can be deployed to the data center 116 to effect instantiation of the application in accordance with the application placement plan 124 that is determined to be optimal. It should be understood that this example is illustrative and therefore should not be construed as being limiting in any way.

From operation 212, the method 200 can proceed to operation 214. At operation 214, the server computer 102 can distribute the one or more commands 128 to the data center 116 (and/or resources 118 thereof) to implement the determined application placement plan 124. As explained above with reference to FIG. 1, the commands 128 can be generated by the orchestration service 126 in some embodiments. Also, as noted above, the orchestration service 126 can be hosted and/or executed by the server computer 102, in some embodiments. Thus, the server computer 102 may distribute the commands 128 using the orchestration service 126. It should be understood that this example is illustrative and therefore should not be construed as being limiting in any way.

The commands 128 distributed in operation 214 can instruct the data center 116 to allocate resources 118 to the application. The commands 128 also can instruct the data center 116 and/or other functionality (e.g., hypervisors, orchestrators, or the like) to deploy applications and/or application components to the resources 118. Thus, the commands 128 can be used to realize the application placement plan 124 by causing deployment of the application and/or application components, as optimized by the application deployment engine 106, to the one or more data centers 116.

From operation 214, the method 200 can proceed to operation 216. The method 200 can end at operation 216.

Figure 3:
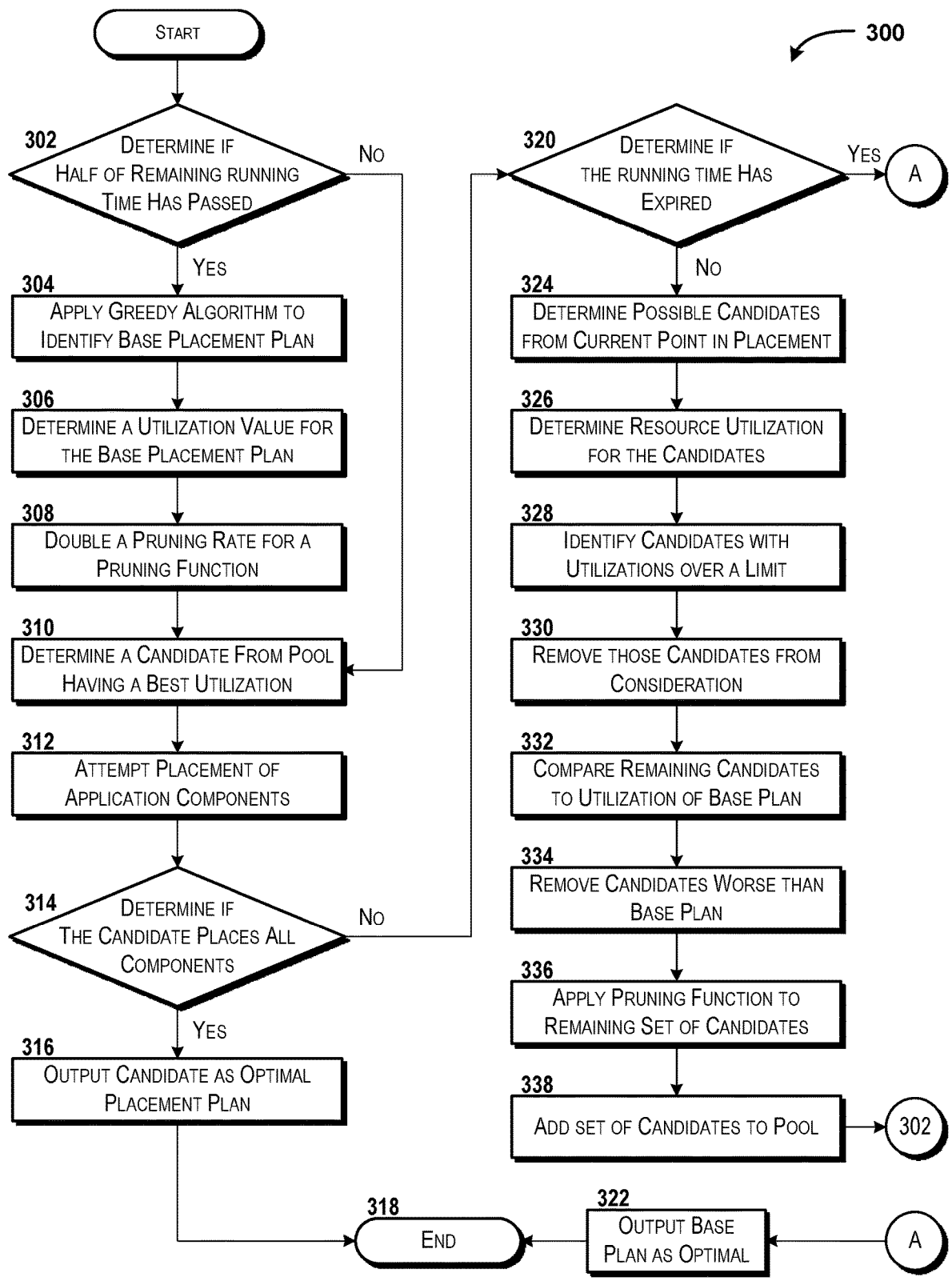
FIG. 3 is a flow diagram showing aspects of a method for identifying an application placement plan, according to another illustrative embodiment of the concepts and technologies described herein.

Turning now to FIG. 3, aspects of a method 300 for identifying an application placement plan 124 will be described in detail, according to an illustrative embodiment. It should be understood that the functionality of the method 300 can be performed by the server computer 102 in association with performance of operation 210 in FIG. 2, though this is not necessarily the case as the method 300 can be performed at additional and/or alternative times.

The method 300 can begin at operation 302. At operation 302, the server computer 102 can determine if half of a remaining running time has passed. In a first iteration of the operation 302, the remaining running time can be the original running time as obtained in operation 206, so the server computer 102 can determine if half of the original running time remains in a first iteration of operation 302. In subsequent iterations of operation 302, the remaining running time may be defined differently. In particular, as will be appreciated with reference to the remainder of FIG. 3, if the server computer 102 determines, in operation 302, that at least half of the remaining running time has passed, the server computer 102 can re-define the remaining running time such that a next iteration of the operation 302 can determine if half of the running time as re-defined by the server computer 102 has passed. For example, if half of the running time has passed at one iteration of operation 302, the server computer 102 can redefine the remaining running time as one half of the original running time (e.g., ½t). In a subsequent iteration of operation 302, the server computer 102 can determine if one half of the remaining running time (½t) remains. It should be understood that this example is illustrative and therefore should not be construed as being limiting in any way.

If the server computer 102 determines, in operation 302, that at least half of the remaining running time has passed, the server computer 102 can re-define the running time as the remaining running time (not separately illustrated in FIG. 3) and the method 300 can proceed to operation 304. At operation 304, the server computer 102 can apply a greedy algorithm to identify a baseline optimal placement plan (shortened to "base placement plan" or "base plan" in FIG. 3). It can be appreciated that almost any greedy algorithm can be applied by the server computer 102 in operation 304, and that the greedy algorithm can attempt to identify the baseline optimal placement plan based on any consideration such as, for example, memory utilization, processor utilization, bandwidth utilization, combinations thereof, or the like.

As is generally understood, a greedy algorithm can be applied efficiently and quickly, and as such, the greedy algorithm can quickly identify a baseline optimal placement plan that places each component of the application to a resource 118. According to one contemplated embodiment, the greedy algorithm can sort the available resources 118 according to utilization (of any aspect) and then select and attempt to place each application component (in order of utilization of any aspect) to the resources 118. The identified baseline optimal placement plan, however, may not be a globally optimal placement plan. As such, the concepts and technologies described herein apply additional analysis to determine if the baseline optimal placement plan is a globally optimal placement plan and/or if that plan can be further improved upon, as will be more fully understood with reference to the remainder of FIG. 3 below.

From operation 304, the method 300 can proceed to operation 306. At operation 306, the server computer 102 can determine a utilization value associated with the baseline optimal placement plan determined by application of the greedy algorithm in operation 304. The utilization value determined in operation 306 can reflect utilization of the resources 118 if the application is placed in accordance with the baseline optimal placement plan. Thus, the utilization value determined in operation 306 can correspond to a processor utilization, a storage utilization, a bandwidth utilization, and/or other utilizations and/or a combination thereof. The utilization value also can identify how many servers (or other components of the resources 118) will be used in accordance with this plan. The general goal of application placement can include minimizing the number of servers and total bandwidth usage. The concepts and technologies described herein can address this general goal, in some embodiments.

From operation 306, the method 300 can proceed to operation 308. At operation 308, the server computer 102 can double the pruning rate for the pruning function. The pruning function and the use thereof will be explained in more detail below. The pruning rate associated with that pruning function, however, can be doubled each time it is determined, in any iteration of operation 302, that over half of the currently defined remaining running time has passed. Thus, in a first iteration of operation 308, the pruning rate can be doubled when half of the original running time has passed. It should be understood that this example is illustrative and therefore should not be construed as being limiting in any way.

From operation 308, the method 300 can proceed to operation 310. The method 300 also can proceed to operation 310 if the server computer 102 determines, in operation 302, that half of the remaining running time has not passed. At operation 310, the server computer 102 can determine, from a pool of placement candidates, a candidate that has a best utilization value. As explained above, the server computer 102 can determine a utilization value for the baseline optimal utilization plan. Also, the server computer 102 can maintain a global pool of placement candidates. This pool can be updated during execution of the method 300 with new candidates considered by the server computer 102, and a utilization value can be determined for each candidate. Thus, in operation 310, the server computer 102 can determine, among the global pool of candidates, a candidate having a best utilization value.

From operation 310, the method 300 can proceed to operation 312. At operation 312, the server computer 102 can attempt placement of the application components using the placement candidate determined in operation 310. Thus, the server computer 102 can attempt to place each application component in accordance with the placement plan determined in operation 310 (as having the best utilization among the candidate placement plans). The server computer 102 can attempt to place each application component and track a current position in the placement (e.g., the first three components have been placed, the first five components have been placed, etc.).

In some cases, the server computer 102 may be able to place each component of the application using the candidate placement plan determined in operation 310. In some other embodiments, the server computer 102 may be unable to place each component as one component may have a utilization that exceeds a limit of any remaining resources at a particular time. For example, an application may include n components (components $c_1, c_2, \ldots, c_n$) and there may exist among the resources 118 $n$ resources ($r_1, r_2, \ldots, r_n$). Thus, the server computer 102 may begin placement of the components to the resources 118 and either place all of the application components or only be able to place some of the application components.

From operation 312, the method 300 can proceed to operation 314. At operation 314, the server computer 102 can determine if the candidate placement plan (determined in operation 310) allows for placement of each component of the application. If the server computer 102 determines that the candidate placement plan allows for placement of each component of the application, the method 300 can proceed to operation 316. At operation 316, the server computer 102 can output the candidate placement plan determined in operation 310 as the optimal placement plan. The method 300 can proceed to operation 318 from operation 316, and the method 300 can end at operation 318.

If the server computer 102 determines, in operation 314, that the candidate placement plan determined in operation 310 does not allow for placement of each component of the application, the method 300 can proceed to operation 320. At operation 320, the server computer 102 can determine if the running time has expired. Thus, it can be appreciated that the server computer 102 can track a timer job or access a timer or timer job and detect expiration of the timer or timer job. It should be understood that this example is illustrative and therefore should not be construed as being limiting in any way.

If the server computer 102 determines, in any iteration of operation 320, that the running time has expired, the method 300 can proceed to operation 322. At operation 322, the server computer 102 can output the baseline optimal placement plan as the optimal placement plan. Thus, the server computer 102 can output the baseline optimal placement plan determined in operation 304 by application of the greedy algorithm as the optimal placement plan. This can be done because according to various embodiments of the method 300, a determination that the running time has expired can indicate that no other candidate that can place all components of the application has been determined to exist as discussed above with reference to operation 314. As such, in such an occurrence the base optimal placement plan may be determined to be the only plan currently known that allows placement of each component of the application. It should be understood that this example is illustrative and therefore should not be construed as being limiting in any way.

If the server computer 102 determines, in operation 320, that the running time has not expired, the method 300 can proceed to operation 324. At operation 324, the server computer 102 can determine possible candidates from a current position in placement of the application components to the resources 118. Thus, it can be appreciated that if the first three components of an application were placed in operation 312, the determining in operation 324 can be for components four and on of the application. Thus, the method 300 can attempt to find candidates that place the first three components in the same way (as determined up to operation 312) and then search for alternatives to placing candidates four and on. Thus, in operation 324, the server computer 102 can generate a set of new placement candidates that will be analyzed as explained below. It should be understood that this example is illustrative and therefore should not be construed as being limiting in any way.

From operation 324, the method 300 can proceed to operation 326. At operation 326, the server computer 102 can determine a resource utilization value for each of the candidates in the set of new placement candidates determined in operation 324. Thus, as explained above, the server computer 102 can determine any combination of one or more of the processor utilization, the memory utilization, the bandwidth utilization, and/or other utilizations associated with each of the set of new placement candidates determined in operation 324.

From operation 326, the method 300 can proceed to operation 328. At operation 328, the server computer 102 can identify any candidates among the set of new placement candidates that have utilization values over a limit. Thus, if a placement candidate specifies placement of an application component having a processor utilization of x and the limit to the remaining resources is ½x for example, the server computer 102 can determine that the utilization of that candidate exceeds a limit. It should be understood that this example is illustrative and therefore should not be construed as being limiting in any way. Some or all such candidates can be identified, and in operation 330, any candidates that exceed the limit can be removed from consideration. Thus, candidates that exceed the limit can be removed from the set of new placement candidates in operation 330. It should be understood that this example is illustrative and therefore should not be construed as being limiting in any way.

From operation 330, the method 300 can proceed to operation 332. At operation 332, the server computer 102 can compare utilization values for the remaining candidates to a utilization value associated with the baseline optimal placement plan. At operation 334, the server computer 102 can remove from consideration (and/or the set of new placement candidates), any candidate that has a utilization value that exceeds the utilization value associated with the baseline optimal placement plan. Thus, the server computer 102 can reduce the number of candidates to be further analyzed by recognizing that those candidates are inferior (at least in terms of a utilization value) to a possible candidate that already exists (e.g., the baseline optimal placement plan).

From operation 334, the method 300 can proceed to operation 336. At operation 336, the server computer 102 can apply the pruning function to the set of new placement candidates as refined in operations 330-334. The pruning function can apply a pruning rate to select a number of the candidates from the set of new placement candidates. If the pruning rate is 0.5, for example, the server computer 102 can remove half of the candidates from the set of new placement candidates. It should be understood that this example is illustrative and therefore should not be construed as being limiting in any way.

By removing candidates from the set of new placement candidates, the server computer 102 can reduce the amount of time that will be used to identify the optimal placement plan in operation 310. In some embodiments, the server computer 102 randomly prunes the candidates from the set of new placement candidates and in some other embodiments, the server computer 102 can prune the placement candidates having the highest utilizations from the set of new placement candidates. The pruning function can be configured by software and/or settings by any authorized entity.

From operation 336, the method 300 can proceed to operation 338. At operation 338, the server computer 102 can add the set of new placement candidates (as refined in operations 330-334 and as pruned in operation 336) to the global pool of candidates. From operation 338, the method 300 can return to operation 302, and the server computer 102 can again determine if half of the remaining running time has passed. The method 300 can be terminated at any time or repeated until the server computer 102 determines, in any iteration of operation 314 that a candidate places all components of the application or until the server computer 102 determines, in any iteration of operation 320 that the running time has expired. It should be understood that this example is illustrative and therefore should not be construed as being limiting in any way. It can be appreciated that the method 200 can resume after completion of the method 300, in some embodiments.

Figure 4:
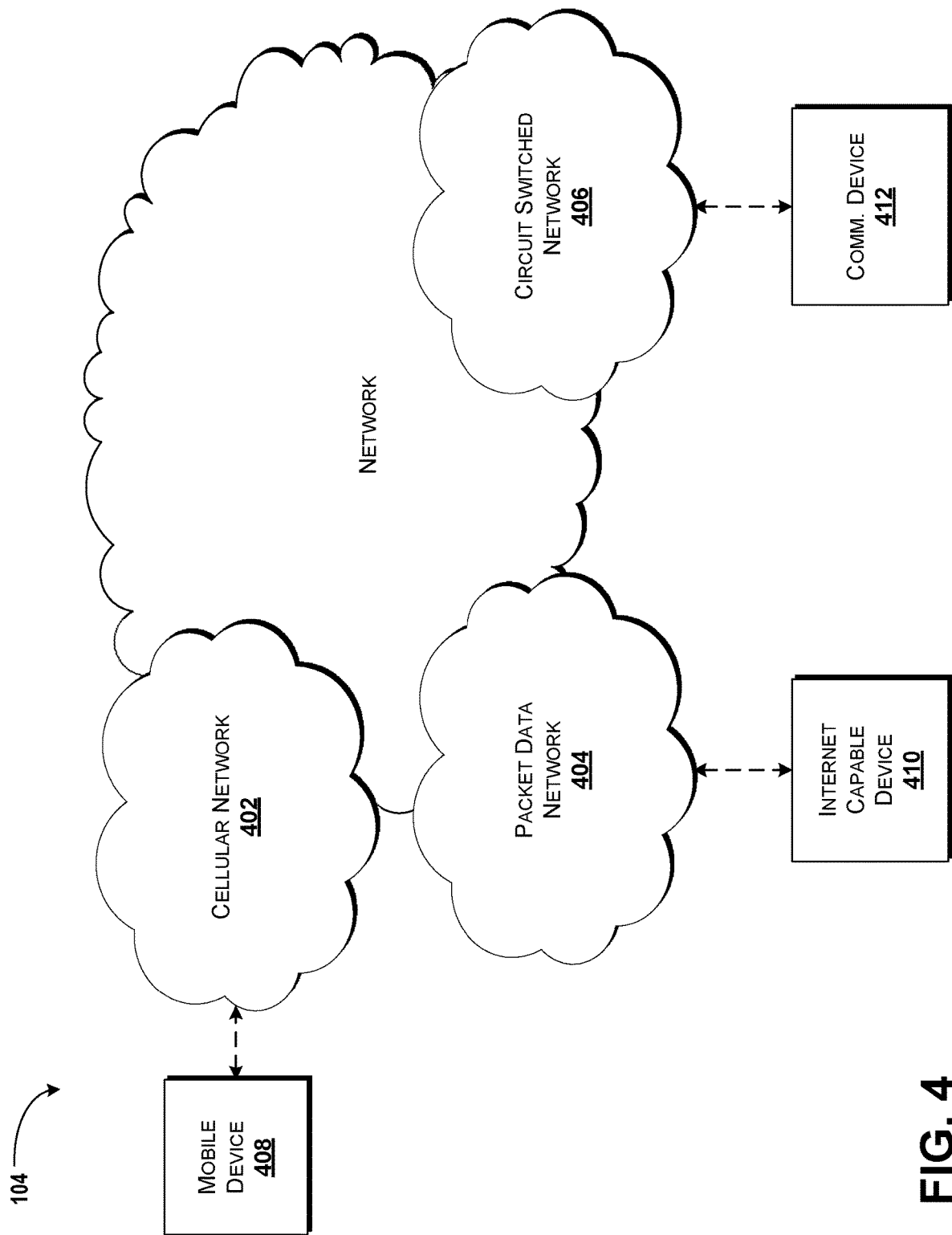
FIG. 4 schematically illustrates a network, according to an illustrative embodiment of the concepts and technologies described herein.

Turning now to FIG. 4, additional details of the network 104 are illustrated, according to an illustrative embodiment. The network 104 includes a cellular network 402, a packet data network 404, for example, the Internet, and a circuit switched network 406, for example, a publicly switched telephone network ("PSTN"). The cellular network 402 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 402 also includes radios and nodes for receiving and transmitting voice, data, and combinations thereof to and from radio transceivers, networks, the packet data network 404, and the circuit switched network 406.

A mobile communications device 408, such as, for example, a cellular telephone, a user equipment, a mobile terminal, a PDA, a laptop computer, a handheld computer, and combinations thereof, can be operatively connected to the cellular network 402. The cellular network 402 can be configured as a 2G GSM network and can provide data communications via GPRS and/or EDGE. Additionally, or alternatively, the cellular network 402 can be configured as a 3G UMTS network and can provide data communications via the HSPA protocol family, for example, HSDPA, EUL (also referred to as HSDPA), and HSPA+. The cellular network 402 also is compatible with 4G mobile communications standards as well as evolved and future mobile standards.

The packet data network 404 includes various devices, for example, servers, computers, databases, and other devices in communication with one another, as is generally known. The packet data network 404 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 404 includes or is in communication with the Internet. The circuit switched network 406 includes various hardware and software for providing circuit switched communications. The circuit switched network 406 may include, or may be, what is often referred to as a plain old telephone system (POTS). The functionality of a circuit switched network 406 or other circuit-switched network are generally known and will not be described herein in detail.

The illustrated cellular network 402 is shown in communication with the packet data network 404 and a circuit switched network 406, though it should be appreciated that this is not necessarily the case. One or more Internet-capable devices 410, for example, a PC, a laptop, a portable device, or another suitable device, can communicate with one or more cellular networks 402, and devices connected thereto, through the packet data network 404. It also should be appreciated that the Internet-capable device 410 can communicate with the packet data network 404 through the circuit switched network 406, the cellular network 402, and/or via other networks (not illustrated).

As illustrated, a communications device 412, for example, a telephone, facsimile machine, modem, computer, or the like, can be in communication with the circuit switched network 406, and there through to the packet data network 404 and/or the cellular network 402. It should be appreciated that the communications device 412 can be an Internet-capable device, and can be substantially similar to the Internet-capable device 410. In the specification, the network 104 is used to refer broadly to any combination of the networks 402, 404, 406. It should be appreciated that substantially all of the functionality described with reference to the network 104 can be performed by the cellular network 402, the packet data network 404, and/or the circuit switched network 406, alone or in combination with other networks, network elements, and the like.

Figure 5:
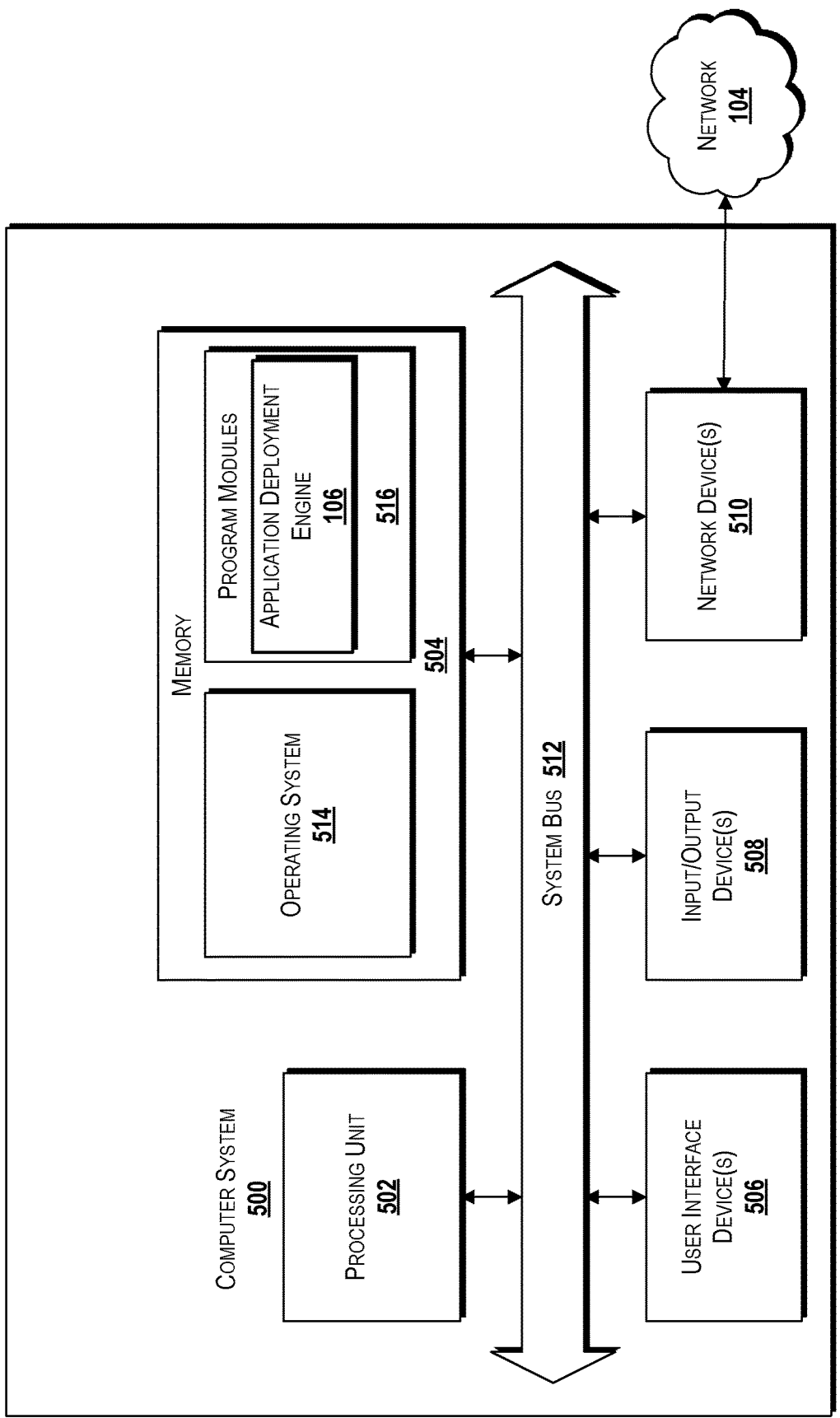
FIG. 5 is a block diagram illustrating an example computer system configured to provide an application placement engine, according to some illustrative embodiments of the concepts and technologies described herein.

FIG. 5 is a block diagram illustrating a computer system 500 configured to provide the functionality described herein for providing and/or using an application deployment engine, in accordance with various embodiments of the concepts and technologies disclosed herein. The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 504 communicates with the processing unit 502 via the system bus 512. In some embodiments, the memory 504 is operatively connected to a memory controller (not shown) that enables communication with the processing unit 502 via the system bus 512. The memory 504 includes an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 516 may include various software and/or program modules described herein. In some embodiments, for example, the program modules 516 include the application deployment engine 106. This and/or other programs can be embodied in computer-readable media containing instructions that, when executed by the processing unit 502, perform one or more of the methods 200, 300 described in detail above with respect to FIGS. 2-3. According to embodiments, the program modules 516 may be embodied in hardware, software, firmware, or any combination thereof. Although not shown in FIG. 5, it should be understood that the memory 504 also can be configured to store the application request 108, the application templates 112, the network topology data 122, the commands 128, and/or other data, if desired.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium" and variations thereof does not include waves or signals per se and/or communication media.

The user interface devices 506 may include one or more devices with which a user accesses the computer system 500. The user interface devices 506 may include, but are not limited to, computers, servers, personal digital assistants, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer.

The network devices 510 enable the computer system 500 to communicate with other networks or remote systems via a network, such as the network 104. Examples of the network devices 510 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Based on the foregoing, it should be appreciated that systems and methods for providing an application deployment engine have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
obtaining, by a processor, an application template associated with an application, wherein the application template describes resources used by the application and an application flow path associated with the application;
identifying, by the processor and based on the application template and a network topology, a candidate placement plan from a pool of candidate placement plans, wherein the candidate placement plan is identified based on a utilization value;
determining, by the processor, if the candidate placement plan places all components of the application; and
if a determination is made that the candidate placement plan places all components of the application,
outputting, by the processor, the candidate placement plan as an optimal placement plan, and
generating, by the processor, a command to effect deployment of the application in accordance with the optimal placement plan.

2. The method of claim 1, further comprising:
obtaining, by the processor, a running time during which the optimal placement plan is to be identified from the pool of candidate placement plans.

3. The method of claim 2, further comprising:
if a determination is made that the candidate placement plan does not place all components of the application, determining if the running time has expired; and
if the running time has expired, outputting the candidate placement plan as the optimal placement plan.

4. The method of claim 2, further comprising:
if a determination is made that the candidate placement plan does not place all components of the application, determining if the running time has expired; and
if the running time has not expired,
determining a set of candidate placement plans,
determining a resource utilization for each of the set of candidate placement plans,
removing, from the set of candidate placement plans, candidate plans having associated utilization values that exceed a limit,
applying a pruning function to the set of candidate placement plans to remove a portion of the set of candidate placement plans in accordance with a pruning rate, and
adding the set of candidate placement plans to the pool of candidate placement plans.

5. The method of claim 4, further comprising:
determining if half of the running time has expired; and
if a determination is made that half of the running time has expired,
applying a greedy algorithm to the pool of candidate placement plans to identify a base placement plan,
determining a base resource utilization value for the base placement plan, and
attempting placement of the application in accordance with the base placement plan.

6. The method of claim 2, further comprising:
if a determination is made that the candidate placement plan does not place all components of the application, determining if the running time has expired; and
if the running time has not expired,
determining a set of candidate placement plans,
determining a resource utilization for each of the set of candidate placement plans,
removing, from the set of candidate placement plans, candidate plans having associated utilization values that exceed a limit,
removing, from the set of candidate placement plans, candidate plans having associated utilization values that exceed a base resource utilization associated with a base placement plan,
applying a pruning function to the set of candidate placement plans to remove a portion of the set of candidate placement plans in accordance with a pruning rate, and
adding the set of candidate placement plans to the pool of candidate placement plans.

7. The method of claim 6, further comprising:
determining if half of the running time has expired; and
if a determination is made that half of the running time has expired,
applying a greedy algorithm to the pool of candidate placement plans to identify the base placement plan,
determining a base resource utilization value for the base placement plan, and
attempting placement of the application in accordance with the base placement plan.

8. A system comprising:
a processor; and
a memory that stores computer-executable instructions that, when executed by the processor, cause the processor to perform operations comprising
obtaining an application template associated with an application, wherein the application template describes resources used by the application and an application flow path associated with the application,
identifying, based on the application template and a network topology, a candidate placement plan from a pool of candidate placement plans, wherein the candidate placement plan is identified based on a utilization value,
determining if the candidate placement plan places all components of the application, and
if a determination is made that the candidate placement plan places all components of the application,
outputting the candidate placement plan as an optimal placement plan, and
generating a command to effect deployment of the application in accordance with the optimal placement plan.

9. The system of claim 8, wherein the computer-executable instructions, when executed by the processor, cause the processor to perform operations further comprising:
obtaining, by the processor, a running time during which the optimal placement plan is to be identified from the pool of candidate placement plans.

10. The system of claim 9, wherein the computer-executable instructions, when executed by the processor, cause the processor to perform operations further comprising:
if a determination is made that the candidate placement plan does not place all components of the application, determining if the running time has expired; and
if the running time has expired, outputting the candidate placement plan as the optimal placement plan.

11. The system of claim 9, wherein the computer-executable instructions, when executed by the processor, cause the processor to perform operations further comprising:
if a determination is made that the candidate placement plan does not place all components of the application, determining if the running time has expired; and if the running time has not expired,
  determining a set of candidate placement plans,
  determining a resource utilization for each of the set of candidate placement plans,
  removing, from the set of candidate placement plans, candidate plans having associated utilization values that exceed a limit,
  applying a pruning function to the set of candidate placement plans to remove a portion of the set of candidate placement plans in accordance with a pruning rate, and
  adding the set of candidate placement plans to the pool of candidate placement plans.

12. The system of claim 11, wherein the computer-executable instructions, when executed by the processor, cause the processor to perform operations further comprising:
  determining if half of the running time has expired; and
  if a determination is made that half of the running time has expired,
    applying a greedy algorithm to the pool of candidate placement plans to identify a base placement plan,
    determining a base resource utilization value for the base placement plan, and
    attempting placement of the application in accordance with the base placement plan.

13. The system of claim 9, wherein the computer-executable instructions, when executed by the processor, cause the processor to perform operations further comprising:
  if a determination is made that the candidate placement plan does not place all components of the application, determining if the running time has expired; and
  if the running time has not expired,
    determining a set of candidate placement plans,
    determining a resource utilization for each of the set of candidate placement plans,
    removing, from the set of candidate placement plans, candidate plans having associated utilization values that exceed a limit,
    removing, from the set of candidate placement plans, candidate plans having associated utilization values that exceed a base resource utilization associated with a base placement plan,
    applying a pruning function to the set of candidate placement plans to remove a portion of the set of candidate placement plans in accordance with a pruning rate, and
    adding the set of candidate placement plans to the pool of candidate placement plans.

14. The system of claim 13, wherein the computer-executable instructions, when executed by the processor, cause the processor to perform operations further comprising:
  determining if half of the running time has expired; and
  if a determination is made that half of the running time has expired,
    applying a greedy algorithm to the pool of candidate placement plans to identify the base placement plan,
    determining a base resource utilization value for the base placement plan, and
    attempting placement of the application in accordance with the base placement plan.

15. A computer storage medium having computer-executable instructions stored thereon that, when executed by a processor, cause the processor to perform operations comprising:
  obtaining an application template associated with an application, wherein the application template describes resources used by the application and an application flow path associated with the application;
  identifying, based on the application template and a network topology, a candidate placement plan from a pool of candidate placement plans, wherein the candidate placement plan is identified based on a utilization value;
  determining if the candidate placement plan places all components of the application; and
  if a determination is made that the candidate placement plan places all components of the application,
    outputting the candidate placement plan as an optimal placement plan, and
    generating a command to effect deployment of the application in accordance with the optimal placement plan.

16. The computer storage medium of claim 15, wherein the computer-executable instructions, when executed by the processor, cause the processor to perform operations further comprising:
  obtaining, by the processor, a running time during which the optimal placement plan is to be identified from the pool of candidate placement plans.

17. The computer storage medium of claim 16, wherein the computer-executable instructions, when executed by the processor, cause the processor to perform operations further comprising:
  if a determination is made that the candidate placement plan does not place all components of the application, determining if the running time has expired; and
  if the running time has expired, outputting the candidate placement plan as the optimal placement plan.

18. The computer storage medium of claim 16, wherein the computer-executable instructions, when executed by the processor, cause the processor to perform operations further comprising:
  if a determination is made that the candidate placement plan does not place all components of the application, determining if the running time has expired; and
  if the running time has not expired,
    determining a set of candidate placement plans,
    determining a resource utilization for each of the set of candidate placement plans,
    removing, from the set of candidate placement plans, candidate plans having associated utilization values that exceed a limit,
    applying a pruning function to the set of candidate placement plans to remove a portion of the set of candidate placement plans in accordance with a pruning rate, and
    adding the set of candidate placement plans to the pool of candidate placement plans.

19. The computer storage medium of claim 18, wherein the computer-executable instructions, when executed by the processor, cause the processor to perform operations further comprising:
  determining if half of the running time has expired; and
  if a determination is made that half of the running time has expired,
    applying a greedy algorithm to the pool of candidate placement plans to identify a base placement plan,
    determining a base resource utilization value for the base placement plan, and
    attempting placement of the application in accordance with the base placement plan.

20. The computer storage medium of claim 16, wherein the computer-executable instructions, when executed by the processor, cause the processor to perform operations further comprising:
- if a determination is made that the candidate placement plan does not place all components of the application, determining if the running time has expired; and
- if the running time has not expired,
  - determining a set of candidate placement plans,
  - determining a resource utilization for each of the set of candidate placement plans,
  - removing, from the set of candidate placement plans, candidate plans having associated utilization values that exceed a limit,
  - removing, from the set of candidate placement plans, candidate plans having associated utilization values that exceed a base resource utilization associated with a base placement plan,
  - applying a pruning function to the set of candidate placement plans to remove a portion of the set of candidate placement plans in accordance with a pruning rate, and
  - adding the set of candidate placement plans to the pool of candidate placement plans.

* * * * *